Patented July 27, 1948

2,445,893

UNITED STATES PATENT OFFICE 2,445,893

WELL DRILLING MUD AND PROCESS

Gerald B. Tjoflat, Mount Lebanon, Pa., assignor to Hall Laboratories, Inc., Pittsburgh, Pa., a corporation of Pennsylvania No Drawing. Application February 18, 1944, Serial No. 522,973

14 Claims. (Cl. 252—8.5)

This invention relates to well drilling mud and to a process of controlling the viscosity of well drilling mud.

In drilling oil wells, for example, it is customary to employ a mud or fluid which serves various purposes which are well known. The drilling mud is circulated from a sump above the ground down through the drill pipe, through the drill bit where it picks up the chips formed by the drill, and then up the bore to screens where the chips are removed. The mud passes to a sump in which sand settles and the mud is again circulated through the bore. The mud also serves to lubricate the drill pipe, to seal the wall of the bore, and to provide a hydrostatic head which prevents the well from blowing out, in case high formation gas pressures are encountered.

In order to increase the weight of the drilling mud, it has been customary in the past to add weighting material, such, for example, as barite or hematite. While these or other materials are satisfactory from the standpoint of increasing the weight of the mud, they increase or have a tendency to increase the viscosity of the mud, so that it becomes more difficult to pump. If it is attempted to increase the weight of the mud by increasing the proportion of clay to water either with or without the addition of weighting agents, the viscosity likewise is increased too much. Contamination of the mud by salt brines or as a result of cementing operations likewise causes the viscosity to increase undesirably.

Various materials have been added to drilling muds in order to control their viscosity. One class of material which has been used for this purpose is rapidly water-soluble sodium phosphate glass of the type of Graham's salt. While this material rapidly and effectively reduces the viscosity of the mud, its effect is not as long lasting as is desired. It reverts to the ineffective orthophosphate after a time, this reversion being accelerated at high temperatures such as may be encountered in the drilling of deep wells. Quantities of sodium phosphate glass must be added to the mud from time to time in order to make up for the loss of this material due to reversion to the ineffective orthophosphate.

It has been proposed heretofore to add to the mud solid particles of water-insoluble crystalline sodium metaphosphate or water-insoluble crystalline potassium metaphosphate, or mixtures thereof. Such solid particles of insoluble crystalline metaphosphates dissolve in pure water to a limited and very slight extent, but react slowly and continuously in drilling mud to maintain the desired properties in it and particularly to maintain the mud in a suitably fluid condition. When solid particles of crystalline water-insoluble sodium metaphosphate are added to drilling mud, their effect in reducing the viscosity of the drilling mud is not as rapid as may be desired in some cases. When solid particles of water-insoluble crystalline potassium metaphosphate are added to drilling mud their rate of reaction is relatively rapid as compared with that of crystalline water-insoluble sodium metaphosphate, although not nearly as rapid as the rate of solution of Graham's salt. However, the addition of solid particles of water-insoluble potassium metaphosphate to drilling mud has the transient effect of thickening the mud rather than reducing its viscosity although with lapse of time the viscosity of the mud is reduced.

If a mixture of solid particles of water-insoluble sodium metaphosphate and water-insoluble potassium metaphosphate is added to drilling mud the rate of reaction of the mixture is more rapid than that of the water-insoluble crystalline sodium metaphosphate alone and the effect of the mixture on the mud is to stabilize it over a longer period of time than would the addition of water-insoluble crystalline potassium metaphosphate alone. However the mixture has the transient effect of thickening the mud when first added and this is objectionable in some instances.

In accordance with the present invention I treat drilling mud with water-insoluble crystalline sodium metaphosphate together with a water-soluble compound of an alkali metal other than sodium, or with water-insoluble crystalline potassium metaphosphate together with a water-soluble compound of an alkali metal other than potassium, or I may employ both water-insoluble sodium metaphosphate and water-insoluble potassium metaphosphate together with one or more water-soluble alkali-metal compounds. By my invention the water-insoluble crystalline sodium metaphosphate is made more rapidly reactive by the water-soluble compound of an alkali metal other than sodium, and the water-insoluble crystalline potassium metaphosphate is made more rapidly reactive by the water-soluble compound of an alkali metal other than potassium. Accordingly I obtain a more rapid reduction in the viscosity of the mud to the desired value. A mud treated in accordance with my invention not only has its viscosity reduced to the desired range very rapidly, but the mud so treated is stable, that is, retains its desired range of viscosity for a very long period of time as compared with mud treated with the rapidly soluble sodium phosphate glass. Thus by my invention I obtain the combined advantages of rapid effect in reducing the viscosity of the mud together with the stabilization of the mud over long periods of time so that it is not necessary to add my stabilizing mixture to the mud as often or in as great a quantity as would be the case if sodium phosphate glass were employed.

I have referred to water-insoluble sodium metaphosphate and water-insoluble potassium metaphosphate by which I mean the sodium salt, often designated as Maddrell salt, and the corresponding potassium salt, which were described by R. Maddrell in Philosophical Magazine, Series 3, vol. 30 (1847), page 329, and have been called salts of monometaphosphoric acid or monometaphosphates by T. Fleitmann in Poggendorf's Annalen, vol. 78 (1849), pages 360–363. The water-insoluble crystalline sodium metaphosphate may be made by heating $NaH_2PO_4$ or $Na_2H_2P_2O_7$ to a temperature above 300 and below 500° C. and cooling either rapidly or slowly. It is advisable to heat the $NaH_2PO_4$ or $Na_2H_2P_2O_7$ to a temperature of from 400 to 450° C. in order to obtain a product which consists almost entirely of the water-insoluble crystalline sodium metaphosphate.

Water-insoluble crystalline potassium metaphosphate may be prepared by heating $KH_2PO_4$ to any temperature above about 300° C. and up to or above its melting point, which is slightly above 800° C., and cooling either rapidly or slowly. If the material is heated to a melt, it should not, however, be cooled with sufficiently extreme means to produce a readily water-soluble glass. When temperatures in the lower part of the range are employed, heating should be conducted for a sufficient time to insure that the product will consist substantially entirely of the water-insoluble crystalline potassium metaphosphate.

As previously stated, if the crystalline water-insoluble metaphosphate which is to be used in treating the drilling mud is $NaPO_3$, I use a water-soluble compound of an alkali metal other than sodium with it. On the other hand, if the water-insoluble crystalline metaphosphate to be added to the drilling mud is $KPO_3$, I use a water-soluble compound of an alkali metal other than potassium with it. Since compounds of the alkali metals lithium, caesium and rubidium are much more expensive than sodium and potassium compounds, I prefer for reasons of economy to use with water-insoluble $NaPO_3$ a water-soluble potassium compound and with water-insoluble $KPO_3$ a water-soluble sodium compound. In either case, the water-soluble compound increases the rate at which the water-insoluble salt reacts to decrease the viscosity of the mud.

I may employ any water-soluble inorganic or organic sodium or potassium salt or compound to provide the sodium or potassium ion which is effective in making the water-insoluble potassium metaphosphate or the water-insoluble sodium metaphosphate react more rapidly to decrease the viscosity of the mud. I mention by way of illustration only, and not by way of limitation, that there may be employed one or more of sodium or potassium hydroxide, carbonate, bicarbonate, sesquicarbonate, chloride, sulphate, nitrate, silicate, orthophosphate, pyrophosphate, tripolyphosphate, metaphosphate, borate, acetate, or sodium or potassium compounds derived from natural organic materials such as tannin and lignin.

Although any water-soluble sodium or potassium compound may be employed, I prefer to employ sodium or potassium compounds having an alkaline reaction, since they appear to stabilize the viscosity-reducing effect of the water-insoluble alkali-metal metaphosphates even better than the water-soluble compounds having a neutral or acid reaction.

In the class of water-soluble alkali-metal compounds suitable for use with the water-insoluble metaphosphates, I mean to include ammonium compounds, for example, any of the existing ammonium compounds corresponding to the sodium or potassium compounds above mentioned. These are more effective upon water-insoluble $KPO_3$ than upon water-insoluble $NaPO_3$ but have some effect in speeding up the action of the latter upon drilling mud.

When I use both water-insoluble $KPO_3$ and water-insoluble $NaPO_3$ together, I may use any water-soluble compound of an alkali metal, including ammonium.

The preferred ratio of water-soluble sodium compound to water-insoluble potassium metaphosphate as expressed in equivalents of Na to $KPO_3$ is about 1:1. However this ratio may vary between about 0.1:1 and about 3:1. A higher ratio than about 3:1 may be employed provided the relatively large amount of water-soluble salt does not adversely affect the viscosity of the mud.

Where a water-soluble potassium compound is employed with water-insoluble crystalline sodium metaphosphate the preferred ratio in equivalents of K to the water-insoluble crystalline $NaPO_3$ is about 1.5:1 or 2:1. The lower effective limit of this range is about 0.5:1 and the upper limit is generally about 3:1. However, this upper ratio may be exceeded if it does not have an adverse effect on the mud.

In treating drilling mud the quantity of water-insoluble crystalline sodium metaphosphate or water-insoluble crystalline potassium metaphosphate, or a mixture thereof, to be added initially to the mud is approximately the same as the amount which would be employed if sodium phosphate glass of the type of Graham's salt were used for treating the mud. For example, in treating a previously untreated mud the preferred quantity of water-insoluble crystalline sodium metaphosphate or potassium metaphosphate, or a mixture thereof, is about 0.10% to 0.40%, based on the weight of the mud. The amount required to maintain a desirable viscosity in the mud will vary with the specific conditions, but in general will be less than the amount of sodium phosphate glass which would be required.

The water-insoluble crystalline sodium metaphosphate and the water-soluble potassium compound, or the water-insoluble potassium metaphosphate and the water-soluble sodium compound, or a mixture thereof, may be introduced into the mud in the form of solid particles or they may be mixed with water and the aqueous mixture added to the mud. It is preferred to make the aqueous mixture before addition to the mud in any case where direct addition of the water-soluble compound and the water-insoluble metaphosphate in solid form produces any undesirable transient effect upon the viscosity of the mud. If an aqueous mixture is employed for addition to the mud, the mixture may be prepared advantageously by heating it to make the water-insoluble crystalline metaphosphate more rapidly reactive when added to the mud. In those cases where I employ both water-insoluble crystalline sodium metaphosphate and water-insoluble crystalline potassium metaphosphate, whether in solid form or mixed with water, I prefer to employ both a water-soluble sodium compound for solubilizing the water-insoluble potassium metaphosphate and a water-soluble potassium compound for solubilizing the water-insoluble sodium metaphosphate. However, where it is not necessary to obtain such a rapid dissolving action I may employ only a water-soluble sodium compound or a water-soluble potassium compound or a water-soluble ammonium salt with the mixture of the two water-insoluble metaphosphates.

In some cases it may be convenient to employ a dry mixture in which one or more water-insoluble crystalline alkali-metal metaphosphates, and one or more water-soluble alkali-metal compounds are mixed with clay, bentonite, with weighting agents such as barite or hematite, or with any or all of the permanently solid components of a drilling mud, prior to the introduction of the mixture of materials into the drilling mud. In this manner, solid material which would normally increase the viscosity when added to the drilling mud may have this undesirable characteristic balanced to any desired degree by admixture of the proper amounts of the water-insoluble and non-hygroscopic alkali-metal metaphosphate and suitable water-soluble alkali-metal compounds. The mixtures of permanently solid components, water-insoluble alkalki-metal metaphosphates and water-soluble alkali-metal compounds may be fed dry to the circulating mud or may be first mixed with water.

The invention is not limited to the preferred proportions or materials but may be otherwise embodied or practiced within the scope of the following claims:

I claim:

1. A drilling fluid comprising an aqueous suspension of clay and containing about 0.10% to 0.40% based on the weight of said drilling fluid of water-insoluble crystalline sodium metaphosphate, and a water soluble potassium compound in amount to provide from 0.5 to 3 equivalents of potassium to one equivalent of said sodium metaphosphate.

2. A drilling fluid comprising an aqueous suspension of clay and containing about 0.10% to 0.40% based on the weight of said drilling fluid of water-insoluble crystalline sodium metaphosphate, and a water soluble compound selected from the group consisting of compounds of ammonium and compounds of alkali metals other than sodium in amount to provide from 0.5 to 3 equivalents of ammonia or alkali metal other than sodium to one equivalent of said sodium metaphosphate.

3. A drilling fluid comprising an aqueous suspension of clay and containing about 0.10% to 0.40% based on the weight of said drilling fluid of water-insoluble crystalline potassium metaphosphate, and a water soluble sodium compound in amount to provide from 0.1 to 3 equivalents of sodium to one equivalent of said potassium metaphosphate.

4. A drilling fluid comprising an aqueous suspension of clay and containing about 0.10% to 0.40% based on the weight of said drilling fluid of water-insoluble crystalline potassium metaphosphate, and a water soluble compound selected from the group consisting of compounds of ammonium and compounds of alkali metals other than potassium in amount to provide from 0.1 to 3 equivalents of ammonia or alkali metal other than potassium to one equivalent of said potassium metaphosphate.

5. A drilling fluid comprising an aqueous suspension of clay and containing about 0.10% to 0.40% based on the weight of said drilling fluid of water-insoluble crystalline sodium metaphosphate, and a water soluble compound selected from the group consisting of alkaline-reacting compounds of ammonium and alkaline-reacting compounds of alkali metals other than sodium in amount to provide from 0.5 to 3 equivalents of ammonia or alkali metal other than sodium to one equivalent of said sodium metaphosphate.

6. A drilling fluid comprising an aqueous suspension of clay and containing about 0.10% to 0.40% based on the weight of said drilling fluid of water-insoluble crystalline potassium metaphosphate, and a water soluble compound selected from the group consisting of alkaline-reacting compounds of ammonium and alkaline-reacting compounds of alkali metals other than potassium in amount to provide from 0.1 to 3 equivalents of ammonia or alkali metal other than potassium to one equivalent of said potassium metaphosphate.

7. A drilling fluid comprising an aqueous suspension of clay and containing about 0.10% to 0.40% based on the weight of said drilling fluid of water insoluble crystalline sodium metaphosphate and water-insoluble crystalline potassium metaphosphate, and at least one water soluble compound selected from the group consisting of compounds of ammonium and compounds of alkali metals in amount to provide from 0.1 to 3 equivalents of ammonia or alkali metal to one equivalent of said water-insoluble metaphosphates.

8. A drilling mixture adapted to form a drilling fluid when added to water, said mixture comprising at least one permanently solid component of drilling fluid and containing about 0.10% to 0.40% based on the weight of said drilling fluid of water-insoluble crystalline sodium metaphosphate, and a water soluble potassium compound in amount to provide from 0.5 to 3 equivalents of potassium to one equivalent of said sodium metaphosphate.

9. A drilling mixture adapted to form a drilling fluid when added to water, said mixture comprising at least one permanently solid component of drilling fluid and containing about 0.10% to 0.40% based on the weight of said drilling fluid of water-insoluble crystalline potassium metaphosphate, and a water soluble sodium compound in amount to provide from 0.1 to 3 equivalents of sodium to one equivalent of said potassium metaphosphate.

10. A drilling mixture adapted to form a drilling fluid when added to water, said mixture comprising at least one permanently solid component of drilling fluid and containing about 0.10% to 0.40% based on the weight of said drilling fluid of at least one water-insoluble crystalline alkali metal metaphosphate, and a water soluble ammonium compound in amount to provide from 0.1 to 3 equivalents of ammonia to one equivalent of said alkali metal metaphosphate.

11. A drilling fluid comprising an aqueous suspension of clay and containing about 0.10% to 0.40% based on the weight of said drilling fluid of at least one water-insoluble crystalline alkali-metal metaphosphate, and at least one water-soluble compound selected from the group consisting of compounds of ammonium and compounds of alkali metals other than the alkali metal of at least one of the water-insoluble metaphosphates in amount to provide from 0.1 to 3 equivalents of ammonia or alkali metal to one equivalent of said water-insoluble metaphosphates.

12. A drilling mixture adapted to form a drilling fluid when added to water, said mixture comprising at least one permanently solid component of drilling fluid and containing about 0.10% to 0.40% based on the weight of the drilling fluid of at least one water-insoluble crystalline alkali metal metaphosphate, and at least one water soluble compound selected from the group consisting of compounds of ammonium and compounds of alkali metals other than the alkali metal of at least one of the water-insoluble metaphosphates in amount to provide from 0.1 to 3 equivalents of ammonia or alkali metal to one equivalent of said water-insoluble metaphosphates.

13. A drilling fluid comprising an aqueous suspension of clay and containing about 0.10% to 0.40% based on the weight of the drilling fluid of water-insoluble crystalline sodium metaphosphate, and a water soluble compound selected from the group consisting of compounds of ammonium and compounds of alkali metals other than sodium in amount to provide from 0.5 to 3 equivalents of ammonia or alkali metal other than sodium to one equivalent of said sodium metaphosphate.

14. A drilling fluid comprising an aqueous suspension of clay and containing about 0.10% to 0.40% based on the weight of the drilling fluid of water-insoluble crystalline potassium metaphosphate, and a water soluble compound selected from the group consisting of compounds of ammonium and compounds of alkali metals other than potassium in amount to provide from 0.1 to 3 equivalents of ammonia or alkali metal other than potassium to one equivalent of said potassium metaphosphate.

GERALD B. TJOFLAT.

REFERENCES CITED

The following references are of record in the file of this patent:

UNITED STATES PATENTS

| Number | Name | Date |
|---|---|---|
| 2,235,95 | Williams | Mar. 25, 1941 |
| 2,292,267 | Garrison | Aug. 4, 1942 |
| 2,324,124 | Williams | July 13, 1943 |

OTHER REFERENCES

Ser. No. 434,621, Rudy et al. (A. P. C.), published June 1, 1943.

Certificate of Correction

Patent No. 2,445,893. July 27, 1948.

GERALD B. TJOFLAT

It is hereby certified that error appears in the printed specification of the above numbered patent requiring correction as follows: Column 8, line 23, list of references cited, for U. S. Patent No. "2,235,95" read *2,235,955*; and that the said Letters Patent should be read with this correction therein that the same may conform to the record of the case in the Patent Office.

Signed and sealed this 30th day of November, A. D. 1948.

[SEAL]

THOMAS F. MURPHY,
*Assistant Commissioner of Patents.*